March 31, 1925.  1,532,004
R. TRÖGER
PROTECTIVE SYSTEM
Filed Feb. 14, 1923
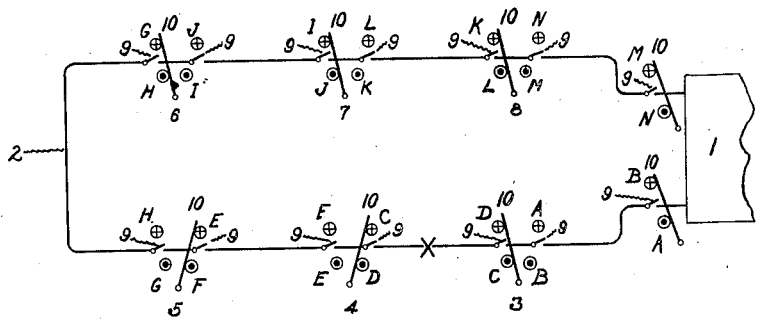
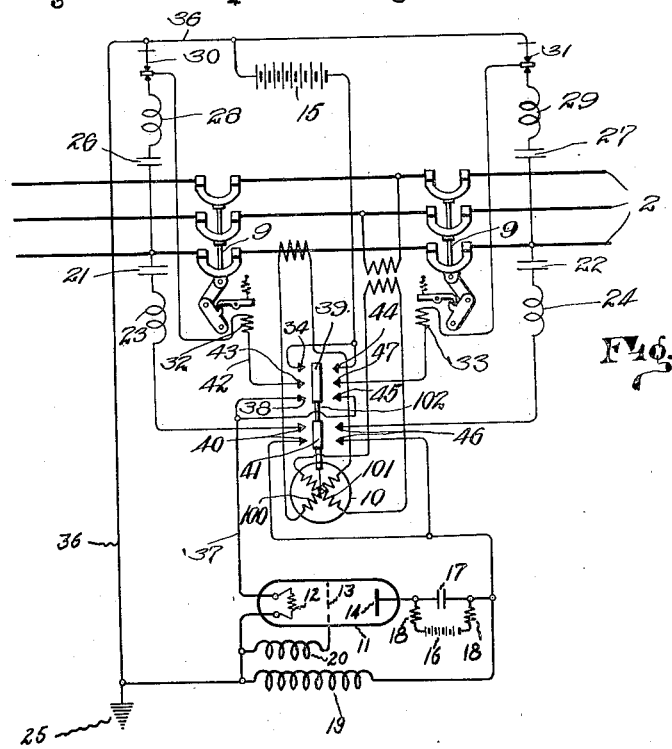
Inventor:
Richard Tröger,
by [signature]
His Attorney.

Patented Mar. 31, 1925.

1,532,004

UNITED STATES PATENT OFFICE.

RICHARD TRÖGER, OF ZEHLENDORF, GERMANY, ASSIGNOR TO GENERAL ELECTRIC COMPANY, A CORPORATION OF NEW YORK.

PROTECTIVE SYSTEM.

Application filed February 14, 1923. Serial No. 619,049.

*To all whom it may concern:*

Be it known that I, RICHARD TRÖGER, a citizen of Germany, residing at Zehlendorf, Germany, have invented certain new and useful Improvements in Protective Systems, of which the following is a specification.

My invention relates to improvements in protective systems for electric power lines and more particularly to systems of protection of the so-called discriminating or selective type and has for an object to provide a novel and improved protective system which is selective or discriminating in its action to control a faulty section of a power line so that continuity of service is maintained on the sound or healthy sections of the line, which dispenses with the use of auxiliary conductors such as pilot wires, and special constructions of power line conductors and cables, and which is in general an improvement from the standpoint of economy and operation on selective protective systems heretofore known to the art.

Selective or discriminating protective systems for electric power lines possess inherent advantages which render them very desirable and there are in general two classes of protective systems of the selective or discriminating type known to the art by means of which satisfactory protection may be obtained. These two classes operate on a balanced or differential principle and therefore require special conductor installations. One of these classes, known as pilot wire protective systems of which there are many modifications, requires one or more auxiliary or pilot wires which are either mounted specially as insulated lines or are incorporated with the cable of the main or power line as insulatd individual wires. This construction is relatively costly and is hardly to be considered for overhead lines. The other class known as divided or split conductor systems requires specially constructed main line or power conductors. This construction is relatively expensive either in cable or overhead lines. Economy in many cases may therefore dictate the use of some other system of protection which does not possess the inherent advantages of either of these classes of protective systems.

By my invention, however, the use of pilot wires and specially constructed cables or power lines is eliminated, for the main line itself, which may be of the ordinary simple construction, is used as a means of transmission for the auxiliary current which may be of relatively high frequency and which is arranged to control the operation of the protective apparatus.

My invention will be better understood from the following description taken in connection with the accompanying drawing and its scope will be pointed out in the appended claims.

Figure 1 illustrates diagrammatically an embodiment of my invention in an electric power system, and Fig. 2 illustrates diagrammatically an embodiment of my invention in the protective apparatus at one station of an electric power system.

The fundamental idea of my invention is based upon the fact that, if a fault or abnormal condition such as a short circuit for example occurs in a loop line, a multiple supply line or a meshed distribution network of any kind between two adjacent distributing or collecting points or stations, power will flow from these stations into the defective or faulty section in opposite directions, that is to say, there will be a reversal of power at one of the stations relatively to the other, but in all the other stations or sections on each side of the faulty section, the direction of power at adjacent stations is the same. Consequently, if fault responsive means such as directional relays are installed at spaced points on the line, as for example at the different stations, the relays at the ends of a section will under normal conditions on the section assume a predetermined relative position while upon the occurrence of a fault on the section they will take a different predetermined relative position. In other words, the relays in the stations on one side of the fault will be deflected in one direction while the relays in the stations on the other side of the fault will be deflected in the opposite direction so that the relays at the ends of the faulty section are deflected in opposite directions. By this change in the relative position of the relays at the ends of a faulty section, a source of alternating current or transmitting apparatus which is adapted to generate oscillations of different predetermined frequencies and which is electrically connected with the power line, may be put into operation at each of the stations at the ends of the faulty section, and simultaneously electroresponsive means or receiving apparatus operative in response to oscillations of a predetermined frequency is connected in circuit at these stations. The frequencies of the transmitting or sending and receiving apparatus in the individual stations are so proportioned that the sending apparatus at one station generates a frequency to which the receiving apparatus at the adjacent station is selectively responsive. Consequently only the receiving apparatus which are at the ends of the faulty sections will act. The receiving apparatus at each station is arranged to control suitable switching means at the respective station whereby the circuit of the power line may be controlled to isolate the faulty section.

In Fig. 1, I have shown by way of example an embodiment of my invention in an electric power distribution network in single line diagram for clearness since the number of conductors or phases of a circuit to be protected as well as whether the circuit is for direct or alternating current, is in accordance with my invention immaterial. In this figure, a power station 1 is arranged to supply a loop line 2 on which are a plurality of substations 3, 4, 5, 6, 7 and 8, dividing the line 2 into sections and provided with suitable switching means 9 whereby any line section between two adjacent stations may be isolated without cutting off service to the stations. At each of the stations, I may provide suitable fault responsive means such as a directional relay 10 operative in response to the direction of power or current at the station and comprising cooperating current and potential windings 100 and 101 respectively arranged to control a movable member such as a circuit controlling element 102 which may be held under normal circuit conditions in a neutral or intermediate position, as shown but will be deflected in one direction or the other according to the direction of power and intensity of power or current at the station. This may be accomplished by an electroresponsive device such as an over-current relay cooperating with the directional relay.

In each sub-station and the main power station, I may provide a transmitting or sending apparatus comprising a source which is adapted to generate oscillatory currents of different predetermined frequencies and which may be arranged to be controlled by the directional relay at the station so as to generate a current of a predetermined frequency dependent upon the direction of the deflection of the movable element of the relay or in the case of a power directional relay, the direction of power at the station. In each station, I may also provide suitable electroresponsive means such as a receiving apparatus which is operative in response to currents of different predetermined frequencies and which may be arranged to be controlled by the directional relay at the station to respond to the predetermined frequency oscillations generated at each of the adjacent stations. In Fig. 1, I have illustrated the transmitting apparatus at each station by a circle with a dot therein and the receiving apparatus by a circle with a cross therein and the reference letters associated with the respective circles may indicate the frequencies which the transmitting apparatus are adapted to generate and to which the receiving apparatus are responsive. Consequently, the deflection in one direction or the other of the movable element of the directional relay 10 at any station puts in circuit the transmitting apparatus at the station to generate oscillations of the predetermined frequency to which the receiving apparatus in the adjacent station is tuned, and also puts in circuit at the station the receiving apparatus which is tuned to oscillations of a predetermined frequency which may be generated by the transmitting apparatus in the adjacent station.

In normal operation, the movable members of the directional relays 10 are in the neutral position and all the transmitting and receiving devices are held inoperative. If now, an overload occurs on a section, as for example a short circuit as indicated by the cross on the section of line 2 between stations 3 and 4, the movable elements of all the relays 10 are deflected. The movable elements of the relays 10 in the line 2 on one side of the fault that is at stations 1, 4, 5, 6, 7 and 8 are deflected in one direction while on the other side of the fault that is at stations 1 and 3 they are deflected in the opposite directions. Therefore in the stations 3 and 4 at the ends of the faulty or defective sections, the movable elements of the relays 10 are deflected in opposite directions as shown in Fig. 1. Consequently the transmitting apparatus which are put into operation to generate oscillations having the frequencies A, F, H, J, L and N exert no control, since no receiving apparatus operative in response to any of these frequencies is put in circuit. On the other hand, as will be obvious from Fig. 1, the transmitting apparatus at station 3 is put into operation to generate oscillations of a predetermined frequency C to which the receiving apparatus controlled by the relay 10 at station 4 is tuned and as will hereinafter be set forth, operates to control the switching means 9 at station 4 in the section of the line 2 between stations 3 and 4. Similarly the transmitting apparatus at station 4 is put into operation to generate oscillations of a predetermined frequency D to which the receiving apparatus controlled by the relay 10 at station 3 is tuned and the operation of the switching means 9 at station 3 in the section of the line 2 between stations 3 and 4 is controlled. In this manner, the faulty or defective section of the line 2 between stations 3 and 4 is isolated without interrupting continuity of service on the system.

Referring now to Fig. 2, for the transmitting apparatus, any suitable means adapted to generate oscillating currents may be used, but I preferably employ an electron discharge device such as an incandescent cathode tube 11 indicated in this case, as of the common three electrode type and embodying the usual feed back connections between the plate and grid circuits. The tube 11 comprises a heating element or filament 12, a grid 13 and a plate 14. The filament 12 is arranged to be supplied with current by a suitable source such as a battery 15, the filament circuit being controlled by the movable element of the directional relay 10 so that with normal conditions on the line 2, the tube is preferably not in operation. An anode or plate battery 16 is connected in the plate circuit in parallel with a capacitance 17 through choke coils 18 as is well known to the art. The feed back connection between the plate and grid circuits is made through inductance coils 19 and 20, mutually inductively related. The frequency at which the tube 11 may be caused to oscillate is determined by capacitances 21 and 22 and inductances 23 and 24 respectively associated therewith, in combination with the capacitance between the conductor 2 and ground, indicated at 25. The receiving apparatus at the station is indicated as simple resonant circuits comprising capacitances 26 and 27 and inductances 28 and 29 respectively. Associated with these resonant circuits are suitable detectors 30 and 31 respectively which may be of the coherer type and which are arranged to control the circuits of the trip coils 32 and 33 whereby these coils are arranged to be energized by the battery 15 to control one or the other of the switching means 9. The resonant circuit 26, 28 may be tuned to a frequency to which the sending apparatus in the adjacent station to the left, for example, may be caused to oscillate while the resonant circuit 27, 29 may be tuned to a frequency to which the sending apparatus in the adjacent station to the right, for example, may be caused to oscillate.

When the movable element of the directional relay 10 is deflected to the left, the circuit of the filament 12 is completed through contact 34, conductor 35, battery 15, conductor 36, filament 12, conductor 37, contact 38, and bridging contact 39 on the movable element of the relay 10. Simultaneously the resonant circuit 21, 23 is completed in parallel to the circuit including the filament 12, the plate 14, choke coils 18 and battery 16, and the inductance 19 by the closing of contacts 40 by the bridging member 41 on the movable element of the relay 10 and through the capacitance existing between the main conductor 2 and ground 25, so that the tube 11 begins to oscillate with a predetermined frequency. This frequency, assuming that Fig. 2 represents the apparatus at station 3, would be that to which the receiving apparatus at station 4 is tuned when the movable element of the directional relay 10 at station 4 is deflected to the right, as illustrated in Fig. 1 and indicated as a frequency C. Similarly, if the movable element of the relay 10 at station 4 is deflected to the right, it will set the transmitting apparatus at station 4 oscillating at a predetermined frequency D, to which the resonant circuit comprising the inductance 28 and the capacitance 26 is tuned and the detector 30 is caused to operate thereby allowing current to flow from the battery 15 through conductor 36, detector 30, trip coil 32, conductor 42, contacts 43 and 34, bridging member 39 and conductor 35. Consequently the left-hand switching means 9 at station 2 is controlled and similarly the right-hand switching means 9 at station 4 is controlled by the receiving apparatus at station 4 operating in response to the oscillations of frequency C transmitted by the sending apparatus at station 3. In this manner, a faulty section of the line 2 such as 3, 4 as indicated in Fig. 1 may be isolated without interrupting continuity of service, on the sound sections. If, however, a fault were to occur in section 1, 3 the movable element of the directional relay 10, see Fig. 2, would be deflected to the right. In this case the bridging contact members 39 and 41 would close contacts 44, 45, 46 and 47, thus causing the tube to oscillate at a different predetermined frequency B established by the inductance 24, the capacity 22 and the capacitance between the main conductor 2 and ground 25, and connecting in circuit the receiving apparatus whose resonant circuit comprising inductance 29 and capacitance 27 is tuned to a frequency A to which the transmitting apparatus in the adjacent station 1 may be caused to oscillate. In this manner the right-hand switching means 9 at station 2 may be controlled and the tube 11 caused to oscillate at a frequency B to which the receiving apparatus at station 1 is responsive to control its associated switching means 9.

Obviously any other system of connections or devices desired may be employed for the transmitting and receiving apparatus. For example, a number of simplifications may be obtained by the common use of a condenser or inductance coil for the various resonant circuits or by combining the batteries or by other arrangements. These, however, will not effect the basic conception which consists of the feature that the actuation of the switches which are to be tripped is controlled by superposing upon the current flowing in the main line, a current of a frequency which may be regulated as desired. The system of connections illustrated has the special advantage that the filament of the tube carries in regular or normal operation no current but has a voltage impressed upon it only during the short period between the occurrence of a fault on the line and the tripping of the corresponding switches. Consequently, the life of the tube is increased to an almost unlimited extent. Obviously any other oscillating current generating devices of the desired character may be employed instead of an electron discharge device.

In case the network of conductors is not operated as a closed ring, special measures must be adopted to cause the cutting out of the parts at the end of a section. This is necessary because in case the section situated between the stations 5 and 6, Fig. 1, is out of operation, the directional relays 10 at these stations cannot regularly be cut out. In order to permit this, any desired over-current protective device, for example, may be employed.

Although I have shown and described my invention in considerable detail, I do not wish to be limited to the specific details thereof, as shown and described, but may use such modifications, substitutions or equivalents thereof, as are embraced within the spirit of my invention.

What I claim as new and desire to secure by Letters Patent of the United States, is:—

1. A protective system of the class described comprising an electric power line, switching means at a plurality of spaced points in said line whereby faulty sections of said line may be isolated, directional relay means at each of said spaced points arranged so that the relay means at the ends of any section assume a predetermined relative position when a fault occurs on said line in another section and assume a different predetermined relative position when a fault occurs on said line in said section, and means selectively responsive to currents of different predetermined frequencies controlled by the conjoint action of said directional relay means for operating the switching means at each end of said section to isolate said section when said relay means assume said different relative position due to a fault in said section.

2. A protective system of the class described comprising an electric power line, switching means at a plurality of spaced points in said line whereby faulty sections of said line may be isolated, directional relays at each end of a section of said line arranged to assume a predetermined relative position when said section is normal and to take a different relative position when a fault occurs in said section, means adapted to generate currents of different predetermined frequencies and arranged to be controlled by said directional relays, and means controlled by said directional relays for operating the switching means at the ends of said section selectively responsive to currents of different predetermined frequencies.

3. A protective system of the class described comprising an electric power line, a plurality of directional relays arranged at spaced points in said line, means arranged to be controlled by the directional relay at one of said spaced points to establish a current of a predetermined frequency dependent upon the direction of power at said point and means at another of said spaced points adjacent said first point controlled by the directional relay at said adjacent point in response to a reversal of power at said adjacent point relatively to said first point operative in respones to the predetermined frequency current established at said first point to control the circuit of the line at said adjacent point.

4. A protective system of the class described comprising an electric power line, a plurality of directional relays arranged at spaced points in said line, means at one of said spaced points adapted to generate currents of different predetermined frequencies and arranged to be controlled by the directional relay at said point to establish a current of a predetermined frequency dependent upon the direction of power at said point, and means at another of said spaced points adjacent the point at which said generating means is located controlled by the directional relay at said adjacent point in response to a reversal of power at said adjacent point relatively to said first point operative in response to the predetermined frequency current established by said generating means to control the circuit of the line at said adjacent point.

5. A protective system of the class described comprising an electric power line, a plurality of directional relays arranged at spaced points in said line, means at one of said spaced points adapted to generate currents of different predetermined frequencies and arranged to be controlled by the directional relay at said point in response to a fault on said line between said point and either of said spaced points adjacent said first point to establish a current of a predetermined frequency dependent upon the direction of power at said first point, and means at said adjacent points controlled by the directional relays at said points in response to a reversal of power at either of said adjacent points relatively to said first point operative in response to the predetermined frequency current established at said first point to control the circuit of the line at the adjacent point at which there is a relative reversal of power.

6. A protective system of the class described comprising an electric power line, switching means at a plurality of spaced points in said line whereby faulty sections thereof may be isolated, an electron discharge device operative in response to a fault on one of said sections to generate oscillations of a predetermined frequency, and means operative in response to the predetermined frequency oscillations generated by said electron discharge device to control the switching means at one end of the faulty section.

7. A protective system of the class described comprising an electric power line, switching means at a plurality of spaced points in said line whereby faulty sections of said line may be isolated, directional relays at each end of a section of said line arranged to assume a predetermined relative position when said section is normal and to take a different relative position upon the occurrence of a fault in said section, electron discharge devices arranged to generate oscillations of different predetermined frequencies and to be controlled by said directional relays, and means controlled by said directional relays for operating the switching means at the ends of said section selectively responsive to oscillations of different predetermined frequencies.

8. A protective system of the class described comprising an electric power line, a plurality of directional relays arranged at spaced points in said line, an electron discharge device, arranged to be controlled by the directional relay at one of said spaced points to generate oscillations of a predetermined frequency dependent upon the direction of power at said point and electro-responsive switching means at another of said spaced points adjacent said first point controlled by the directional relay at said adjacent point in response to a reversal of power at said adjacent point relatively to said first point operative in response to the predetermined frequency oscillations established at said first point to control the circuit of the line at said adjacent point.

9. A protective system of the class described comprising an electric power line, switching means at a plurality of spaced points in said line whereby faulty sections of the line may be isolated, directional relays at each end of a section of said line arranged to assume a predetermined relative position when said section is normal and to take a different relative position upon the occurrence of a fault in said section, means at each end of said section adapted to generate a current of a predetermined frequency and arranged to be controlled by the directional relay at the same end of the section upon the occurrence within said section of a fault such that the relays at the ends of the section take said different relative position, and means at each end of said section arranged to be controlled by the directional relay at the same end of the section operative when said directional relays take said different relative position, in response to the current of predetermined frequency generated at the opposite end of the section to control the switching means at the respective ends of the section whereby to isolate said section.

In witness whereof, I have hereunto set my hand this 28th day of January, 1923.

RICHARD TRÖGER.

Witnesses:
OSKAR LINGER,
KARL G. BREKEBEN.